US009460229B2

(12) United States Patent
Lepeska et al.

(10) Patent No.: US 9,460,229 B2
(45) Date of Patent: Oct. 4, 2016

(54) METHODS AND SYSTEMS FOR IMPLEMENTING A CACHE MODEL IN A PREFETCHING SYSTEM

(75) Inventors: Peter Lepeska, Boston, MA (US); William B. Sebastian, Quincy, MA (US)

(73) Assignee: ViaSat, Inc., Carlsbad, CA (US)

( * ) Notice: Subject to any disclaimer, the term of this patent is extended or adjusted under 35 U.S.C. 154(b) by 362 days.

(21) Appl. No.: 12/252,181

(22) Filed: Oct. 15, 2008

(65) Prior Publication Data
US 2009/0100228 A1  Apr. 16, 2009

Related U.S. Application Data

(60) Provisional application No. 60/980,101, filed on Oct. 15, 2007.

(51) Int. Cl.
G06F 15/16  (2006.01)
G06F 17/30  (2006.01)
H04L 29/08  (2006.01)

(52) U.S. Cl.
CPC ......... *G06F 17/30902* (2013.01); *H04L 67/02* (2013.01); *H04L 67/28* (2013.01); *H04L 67/2842* (2013.01); *H04L 67/2847* (2013.01)

(58) Field of Classification Search
CPC ........... H04L 67/2842; H04L 67/2847; H04L 67/28; H04L 67/02
USPC ....................................................... 709/218
See application file for complete search history.

(56) References Cited

U.S. PATENT DOCUMENTS

| | | | |
|---|---|---|---|
| 5,802,292 A | | 9/1998 | Mogul |
| 6,085,193 A | * | 7/2000 | Malkin et al. ............... 709/200 |
| 6,195,622 B1 | | 2/2001 | Altschuler et al. |
| 6,282,542 B1 | | 8/2001 | Carneal et al. |
| 6,330,561 B1 | * | 12/2001 | Cohen et al. ................. 707/754 |
| 6,389,422 B1 | * | 5/2002 | Doi et al. ..................... 707/784 |
| 6,418,544 B1 | | 7/2002 | Nesbitt et al. |
| 6,453,404 B1 | * | 9/2002 | Bereznyi et al. ............ 711/171 |

(Continued)

OTHER PUBLICATIONS

Craig E. Wills, Mikhail Mikhailov, Towards a better understanding of Web resources and server responses for improved caching, Computer Networks, vol. 31, Issues 11-16, May 17, 1999, pp. 1231-1243, ISSN 1389-1286, DOI: 10.1016/S1389-1286(99)00037-7.*

(Continued)

*Primary Examiner* — Taylor Elfervig

(74) *Attorney, Agent, or Firm* — Kilpatrick Townsend & Stockton LLP

(57) ABSTRACT

The present invention relates to systems and methods of enhancing prefetch operations. The method includes fetching an object from a page on a web server. The method further includes storing, at a proxy server, caching instructions for the fetched object. The proxy server is connected with the client and the object is cached at the client. Furthermore, the method includes identifying a prefetchable reference to the fetched object in a subsequent web page and using the caching instructions stored on the proxy server to determine if a fresh copy of the object will be requested by the client. Further, the method includes, based on the determination that the object will be requested, sending a prefetch request for the object using an If-Modified-Since directive, and transmitting a response to the If-Modified-Since directive prefetch request to a proxy client.

24 Claims, 4 Drawing Sheets

(56) References Cited

U.S. PATENT DOCUMENTS

| | | | |
|---|---|---|---|
| 6,496,520 B1 | 12/2002 | Acosta | |
| 6,505,253 B1 | 1/2003 | Chiu et al. | |
| 6,658,463 B1* | 12/2003 | Dillon et al. | 709/219 |
| 7,130,890 B1 | 10/2006 | Kumar et al. | |
| 7,286,476 B2 | 10/2007 | Helmy et al. | |
| 7,359,890 B1 | 4/2008 | Ku et al. | |
| 7,389,330 B2 | 6/2008 | Dillon et al. | |
| 7,437,438 B2 | 10/2008 | Mogul et al. | |
| 7,555,488 B2 | 6/2009 | Bernstein et al. | |
| 7,587,398 B1* | 9/2009 | Fredricksen et al. | |
| 7,603,616 B2 | 10/2009 | Obata et al. | |
| 7,640,353 B2 | 12/2009 | Shen et al. | |
| 7,653,722 B1 | 1/2010 | Krishna et al. | |
| 7,711,797 B1 | 5/2010 | Huang | |
| 8,074,028 B2 | 12/2011 | Plamondon | |
| 8,812,651 B1* | 8/2014 | Eriksen et al. | 709/224 |
| 8,966,053 B2 | 2/2015 | Sebastian | |
| 2002/0010761 A1 | 1/2002 | Carneal et al. | |
| 2002/0062384 A1 | 5/2002 | Tso | |
| 2003/0061451 A1 | 3/2003 | Beyda | |
| 2003/0115281 A1* | 6/2003 | McHenry et al. | 709/213 |
| 2003/0126232 A1 | 7/2003 | Mogul et al. | |
| 2003/0182437 A1 | 9/2003 | Kobayashi et al. | |
| 2004/0205149 A1* | 10/2004 | Dillon et al. | 709/217 |
| 2004/0215717 A1* | 10/2004 | Seifert et al. | 709/203 |
| 2004/0255048 A1 | 12/2004 | Lev Ran et al. | |
| 2006/0294576 A1 | 12/2006 | Cross et al. | |
| 2007/0038853 A1* | 2/2007 | Day et al. | 713/153 |
| 2007/0156845 A1 | 7/2007 | Devanneaux et al. | |
| 2008/0005736 A1 | 1/2008 | Apacible et al. | |
| 2008/0208789 A1 | 8/2008 | Almog | |
| 2008/0228899 A1 | 9/2008 | Plamondon | |
| 2008/0229025 A1 | 9/2008 | Plamondon | |
| 2009/0019153 A1 | 1/2009 | Sebastian | |
| 2009/0094417 A1 | 4/2009 | Carlson et al. | |
| 2009/0100228 A1* | 4/2009 | Lepeska et al. | 711/125 |
| 2009/0193147 A1 | 7/2009 | Lepeska | |
| 2009/0287842 A1* | 11/2009 | Plamondon | 709/233 |
| 2009/0292791 A1 | 11/2009 | Livshits et al. | |
| 2009/0292824 A1 | 11/2009 | Marashi et al. | |
| 2009/0300208 A1 | 12/2009 | Lepeska | |
| 2010/0067378 A1 | 3/2010 | Cohen et al. | |
| 2010/0088398 A1 | 4/2010 | Plamondon | |
| 2013/0124621 A1 | 5/2013 | Lepeska et al. | |
| 2015/0295804 A1 | 10/2015 | Sebastian | |

OTHER PUBLICATIONS

Kroeger, T. M., Long, D. D., and Mogul, J. C. 1997. Exploring the bounds of web latency reduction from caching and prefetching. In Proceedings of the USENIX Symposium on internet Technologies and Systems on USENIX Symposium on internet Technologies and Systems (Monterey, California, Dec. 8-11, 1997). USENIX Association, Berkeley, CA, 2-2.*

Craig E Wills, Mikhail Mikhailov, Towards a better understanding of Web resources and server responses for improved caching, Computer Networks, vol. 31, Issues 11-16, May 17, 1999, pp. 1231-1243.*

G. Banga, F. Douglis and M. Rabinovich, "Optimistic Deltas for WWW Latency Reduction", In proceedings of the 1997 Usenix Technical Conference, Jan. 1997, p. 1-15.*

K. Kong and D. Ghosal, "Mitigating server-side congestion in the Internet through pseudoserving," in IEEE/ACM Transactions on Networking, vol. 7, No. 4, pp. 530-544, Aug. 1999.*

O. Shigiltchoff, P. K. Chrysanthis and E. Pitoura, "Broadcast data organizations and client side cache," Distributed Computing Systems Workshops, 2003. Proceedings. 23rd International Conference on, 2003, pp. 420-425.*

K. Park and C. S. Hwang, "Client-side caching for nearest neighbor queries," in Journal of Communications and Networks, vol. 7, No. 4, pp. 417-428, Dec. 2005.*

U.S. Appl. No. 12/172,913, filed Jul. 14, 2008.

Non-Final Office Action mailed in U.S. Appl. No. 12/172,913 on May 24, 2010, 22 pgs.

Final Office Action mailed in U.S. Appl. No. 12/172,913 on Oct. 14, 2010, 18 pgs.

Non-Final Office Action mailed in U.S. Appl. No. 12/172,913 on Jul. 31, 2014, 6 pgs.

Notice of Allowance mailed in U.S. Appl. No. 12/172,913 on Oct. 9, 2014, 10 pgs.

U.S. Appl. No. 14/596,968, filed on Jan. 14, 2015, 30 pgs.

Non-Final Office Action mailed in U.S. Appl. No. 13/738,941 on Feb. 27, 2015, 22 pgs.

Chen et al., "Coordinated data prefetching by utilizing reference information at both proxy and web servers", ACM SIGMETRICS Performance Evaluation Review, vol. 29, Issue 2, Sep. 2001, pp. 32-38.

Domenech et al., "The Impact of the Web Prefetching Architecture on the Limits of Reducing User's Perceived Latency", Proceedings of the 2006 IEEE/WIC/ACM International Conference on Web Intelligence, Dec. 18-22, 2006, pp. 740-744.

Fan et al., "Web prefetching between low-bandwidth clients and proxies: potential and performance", ACM SIGMETRICS Performance Evaluation Review, vol. 27, Issue 1, Jun. 1999, pp. 178-187.

Fielding et al., Hypertext Transfer Protocol—HTTP/1.1, Internet Engineering Task Force (IETF), Jun. 1999, 178 pgs.

Final Office Action mailed in U.S. Appl. No. 13/738,941 on Oct. 6, 2015, 22 pgs.

Advisory Action mailed in U.S. Appl. No. 13/738,941 on Feb. 4, 2016, 3 pgs.

Non-Final Office Action mailed in U.S. Appl. No. 13/738,941 on May 16, 2016, 30 pgs.

* cited by examiner

METHODS AND SYSTEMS FOR IMPLEMENTING A CACHE MODEL IN A PREFETCHING SYSTEM

PRIORITY CLAIM

This application claims priority to U.S. Provisional Patent Application Ser. No. 60/980,101, filed Oct. 15, 2007, entitled "CACHE MODEL IN PREFETCHING SYSTEM", which is hereby incorporated be reference herein in its entirety for any purpose.

FIELD OF THE INVENTION

The present invention relates, in general, to cache modeling and, more particularly, to cache modeling in a prefetching system.

BACKGROUND

In general, the prefetching of HTTP content is intended to reduce the latency in downloading web pages that include references to multiple objects by issuing requests from a proxy server and pushing the responses to a proxy client without waiting for the browser to request the items. The proxy server identifies objects to be prefetched by scanning the content of HTML, CSS, Java scripts, or other objects to identify references to items that are likely to be requested by the browser when it receives the object containing the reference. The browser will not request items that are in its cache if the objects are fresh under the HTTP caching rules. Also, if the browser has an item which may be stale, it will issue a request with the "If-modified-since" directive, so that if the object has not changed, a short HTTP response can be returned instead of the full file.

Thus, without a model of the browser cache, the prefetching proxy server would send many objects that will not be requested by the browser and send full files where the browser would normally have received the "Not-modified" responses. This creates extra load on both the proxy server to webhost upstream link and the proxy server to the client accelerated link. Thus, the current system downloads a number of unnecessary objects, which in turn causes slowdown of the link. Hence, improvements in the art are needed.

BRIEF SUMMARY

Embodiments of the present invention are directed to a method of enhancing prefetch operations. The method includes fetching an object from a page on a web server. The method further includes storing, at a proxy server, caching instructions for the fetched object. The proxy server is connected with the client and the object is cached at the client. Furthermore, the method includes identifying a prefetchable reference to the fetched object in a subsequent web page and using the caching instructions stored on the proxy server to determine if a fresh copy of the object will be requested by the client. Further, the method includes, based on the determination that the object will be requested, sending a prefetch request for the object using an If-Modified-Since directive, and transmitting a response to the If-Modified-Since directive prefetch request to a proxy client.

According to further embodiments, a system for enhancing prefetch operations. The system includes a client including a proxy client. The proxy client is configured to transmit object requests. The system further includes a proxy server connected with the client via the proxy client. The proxy server is configured to fetch, on behalf of the client, at least one object from a webpage, store caching instructions for the at least one fetched object, and identify a prefetchable reference to the at least one fetched object in a subsequent web page. The proxy server is further configured to use the caching instructions to determine if a fresh copy of the at least one object will be requested by the client, and based on the determination that a fresh copy of the at least one object will be requested, send a prefetch request for the object using an If-Modified-Since directive. The system further includes a web server connected with the proxy server. The web server is configured to transmit a response to the If-Modified-Since directive prefetch request.

In an alternative embodiment, a machine-readable medium is described. The machine-readable medium includes instructions for enhancing prefetch operations. The machine-readable medium includes instructions for fetching an object from a page on a web server. The machine-readable medium further includes instructions for storing, at a proxy server, caching instructions for the fetched object. The proxy server is connected with the client and the object is cached at the client. Furthermore, the machine-readable medium includes instructions for identifying a prefetchable reference to the fetched object in a subsequent web page and using the caching instructions stored on the proxy server to determine if a fresh copy of the object will be requested by the client. Further, the machine-readable medium includes instructions based on the determination that the object will be requested, sending a prefetch request for the object using an If-Modified-Since directive, and transmitting a response to the If-Modified-Since directive prefetch request to a proxy client.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the disclosure relate to enhancing prefetch operations in network optimization environments. In one embodiment, such enhancements may include only prefetching an object if the object has been modified since it was last prefetched. For example, an object may have been prefetched 2 days ago and, if the object has not been modified in the last 2 days, there is no need to prefetch the object again. Thus, by only prefetching modified (or stale) objects, round trips and bandwidth usage can be minimized.

Figure 1:
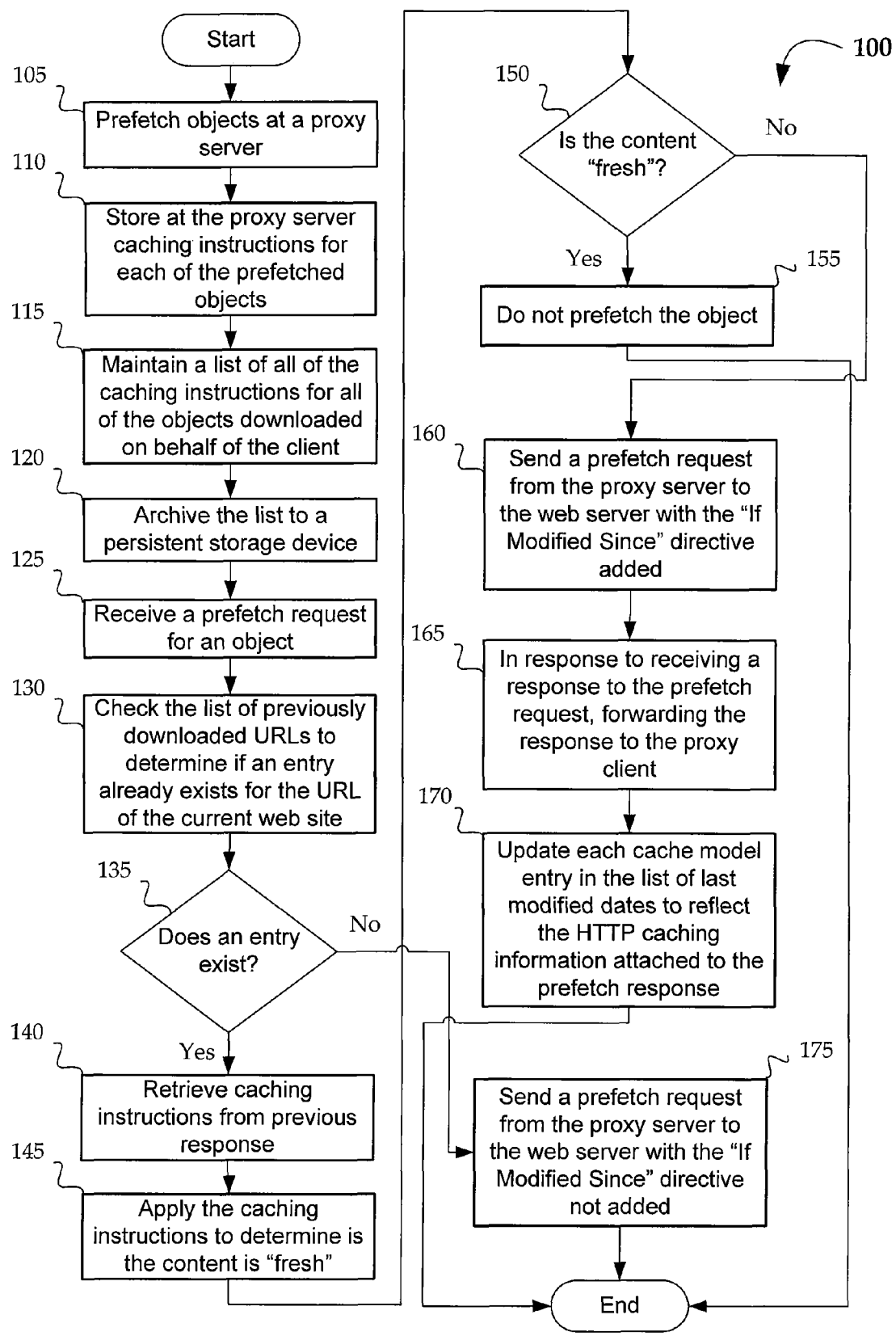
FIG. 1 is a flow diagram illustrating a method of implementing a cache model with a prefetching system, according to embodiments of the present invention.

Turning now to FIG. 1 which illustrates a method 100 according to aspects of the present invention. At process block 105, objects are prefetched by a proxy server. In one embodiment, the proxy server may be an HTTP proxy server. The prefetching may be according to the prefetching methods described in U.S. Provisional Application No. 60/949,492 entitled METHODS AND SYSTEMS FOR PERFORMING A PREFETCH ABORT OPERATION, filed on Jul. 12, 2007 which is incorporated by reference for any and all purposes. In a further embodiment, each of the prefetched objects may include an associated set of, for example, HTTP caching instructions, such as a last modified date, an expiration date, whether caching is permitted, and/or an entity tag. The entity tag may include a checksum of the object. At process block 110, the proxy server may store these caching instructions and the download time for each prefetched object.

In one embodiment, these values may be maintained in, for example, a cache model which includes all of the caching instructions for all objects downloaded by the proxy server on behalf of the client (process block 115). The Cache Model thus may contain a list of universal resource locators (URLs) in the client's browser cache with the same set of caching instructions that may be used by the browser in deciding which items are stale. This browser cache data can be volatile and lost after a browser session has ended. However, in one embodiment, at process block 120, the list created from each session may optionally be archived to a persistent storage device (e.g., a hard disk, an optical disk, a network-attached storage (NAS), etc.). Accordingly, even after a session has ended, the prefetch information may be used in subsequent sessions.

At process block 125, an object prefetch request may be received. In one embodiment, the object may be, for example, a picture file, a cascading style sheet (CSS), text, a hyperlink, etc. The prefetch request may be generated by scanning HTML, CSS, Java Script files, etc. for objects that may be needed to render the associated web page. This scanning may be in accordance to the techniques described in U.S. Provisional Application No. 60/949,493, entitled METHODS AND SYSTEMS FOR JAVA SCRIPT PARSING, FILED ON Jul. 12, 2007, which is incorporated by reference for any and all purposes. Upon receipt of the prefetch request from the scanner, the list of previously downloaded URLs may be checked to determine if an entry already exists for the URL of the current web site (process block 130). At decision block 135, a determination is made if an entry exists for the URL in the cache model.

In one embodiment, if an entry exists for the URL in the cache model, the caching instructions from the previous response for that URL may be retrieved (process block 140). At process block 145, the current date and time may then be applied to the caching instructions in conjunction with the methods of, for example, RFC 2616 to determine if the content is "fresh" (i.e., not modified since it was last prefetched). At decision block 150, the determination is made if the content is "fresh" or not. At process block 155, if the object is "fresh" according to the methods, the probability of the browser emitting a request for the objects is low, and thus it may not be efficient to prefetch the item. However, if the object is "stale" (i.e., has been modified since it was last prefetched), a prefetch request may be uploaded from the proxy server to the web server (process block 160). Thus, since a copy of the item exists in the browser cache, the HTTP "If Modified Since" directive can be attached to the request using the "Last Modified Date" stored in the cache model for the previous response from the URL. If an entry for the prefetch URL does not exist in the cache model, the prefetch request may be sent to the web server, and no "If Modified Since" directive is added (process block 175).

At process block 165, if the proxy server receives a response to the prefetch request, the response may be forwarded to the proxy client using the procedures, for example, that are specified in U.S. Provisional Application No. 60/949,492. In one embodiment, if the response contains the requested object, the proxy client may process it as described in U.S. Provisional Application No. 60/949,492. Since, the "If Modified Since" directive was added to the request, the response may be an HTTP "Not Modified" message. In such a situation, an additional check may be required to insure that the request from the browser contains the "If Modified Since" directive. This can be expected, since the cache model on the proxy server may indicate that a previous copy of the URL was present on the client. In the event that the directive is not present in the request, the prefetched response cannot be used, and the client request may be required to be forwarded to the web server as would be done for other non-prefetched requests.

At process block 170, the cache model entry for the object in the list of last modified dates may be updated to reflect the HTTP caching information attached to the prefetched response. This may be the same process performed in process block 110, as it may be performed on all objects downloaded by the proxy server.

Figure 2:
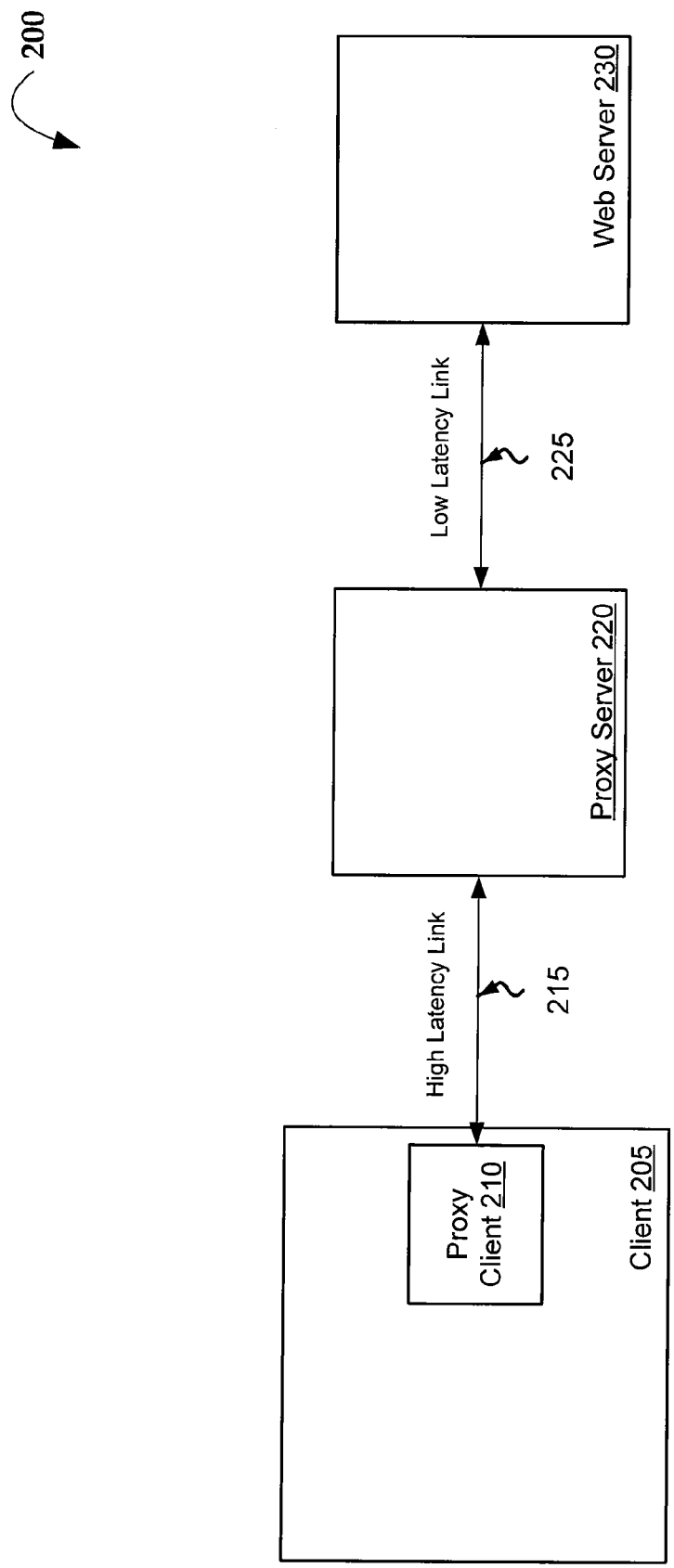
FIG. 2 is a block diagram illustrating a system for implementing a cache model with a prefetching system, according to embodiments of the present invention.

Turning now to FIG. 2 which illustrates one embodiment of a system 200 according to aspects of the present invention. In one embodiment, system 200 may include a client 205. Client 205 may be configured to use a web browser to access various Internet and/or intranet web pages. In one embodiment, client 205 may include a proxy client 210 which may intercept the traffic from the browser. Client 205 may be configured to communicate over a high latency link 215 with proxy server 220 using an optimized transport protocol. The protocol may be, for example, Intelligent Compression Technology's™ (ICT) Transport Protocol (ITP) as described in U.S. Provisional Application No. 60/949,495, filed on Jul. 12, 2007, entitled METHODS AND SYSTEMS FOR BANDWIDTH MEASUREMENT, which is incorporated by reference for any and all purposes.

In one embodiment, proxy server 220 may be the proxy server described above in FIG. 1. In a further embodiment, proxy server 220 may be configured to implement method 100 from FIG. 1. For example, proxy server 220 may identify, based on a request received from proxy client 210 via client 205's browser, objects that may be able to be prefetched. Furthermore, proxy server 220 may store all of the caching instructions for all objects downloaded by proxy server 220 on behalf of client 205.

In one embodiment, proxy server 220 may send a request over low latency link 225 to a web server 230. In one embodiment, the request may include the HTTP "If-modified-since" directive and the time stamp stored in the caching instructions. Web server 230 may then analyze the request and the meta data for the file to determine if the object has been modified since it was last prefetched. Accordingly, if the object has been modified, then web server 230 would download the updated version of the object to the proxy server 225. Otherwise, the web server responds with a "Not-modified" directive. The proxy server 225 then pushes the response to the client proxy 210, which uses it to provide a response to a request from the client web browser 205.

A number of variations and modifications of the disclosed embodiments can also be used. For example, proxy client 210 may be a software or hardware system installed on the same machine as client 205, or proxy client 210 may be implemented on a separate machine as a proxy at the gateway to a branch office or other network serving multiple client machines. In this case, proxy client 205 may be proxying traffic for more than one client web browser, and proxy server 220 may maintain separate browser cache models for each client web browser.

In an additional embodiment, the cache model may be improved by making additional inferences about the client browser based on the pattern of requests that are sent. If the browser uploads requests for items that are known to be in cache and fresh, the browser may be configured to check all items before using them and the proxy server 220 should emit "If-modified-since" requests for fresh objects as well as stale. If requests without the "If-modified-since" directive are received for items that should have been in the cache, proxy server 220 may infer that the cache has been cleared or that the size of the browser cache is insufficient to hold the older objects.

Figure 3:
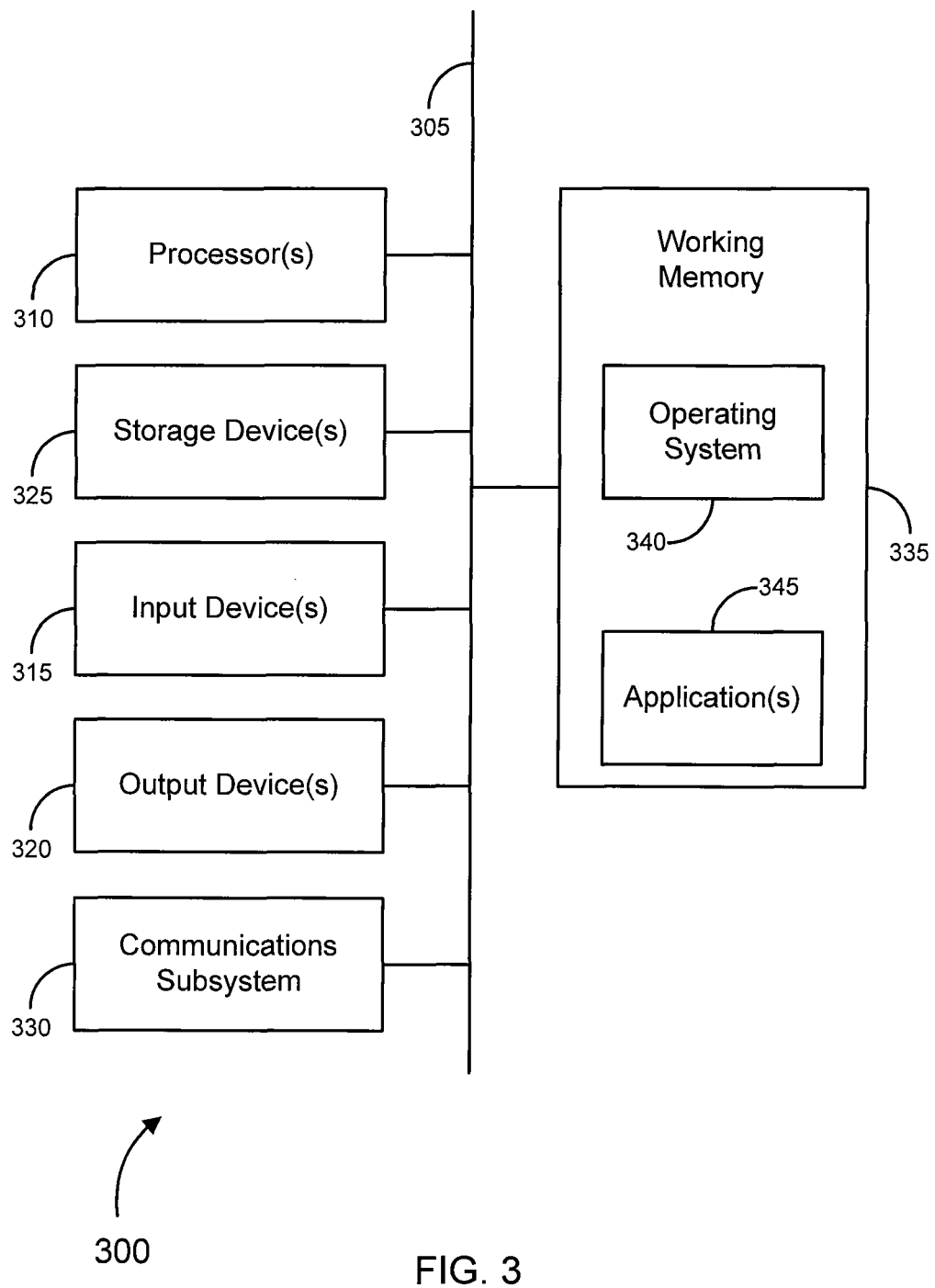
FIG. 3 is a generalized schematic diagram illustrating a computer system, in accordance with various embodiments of the invention.

FIG. 3 provides a schematic illustration of one embodiment of a computer system 300 that can perform the methods of the invention, as described herein, and/or can function, for example, as any part of client 205 or proxy server 220 of FIG. 2. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340 and/or other code, such as one or more application programs 345, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 300) to perform methods of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another machine-readable medium, such as one or more of the storage device(s) 325. Merely by way of example, execution of the sequences of instructions contained in the working memory 335 might cause the processor(s) 310 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 300, various machine-readable media might be involved in providing instructions/code to processor(s) 310 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 325. Volatile media includes, without limitation dynamic memory, such as the working memory 335. Transmission media includes coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc., carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
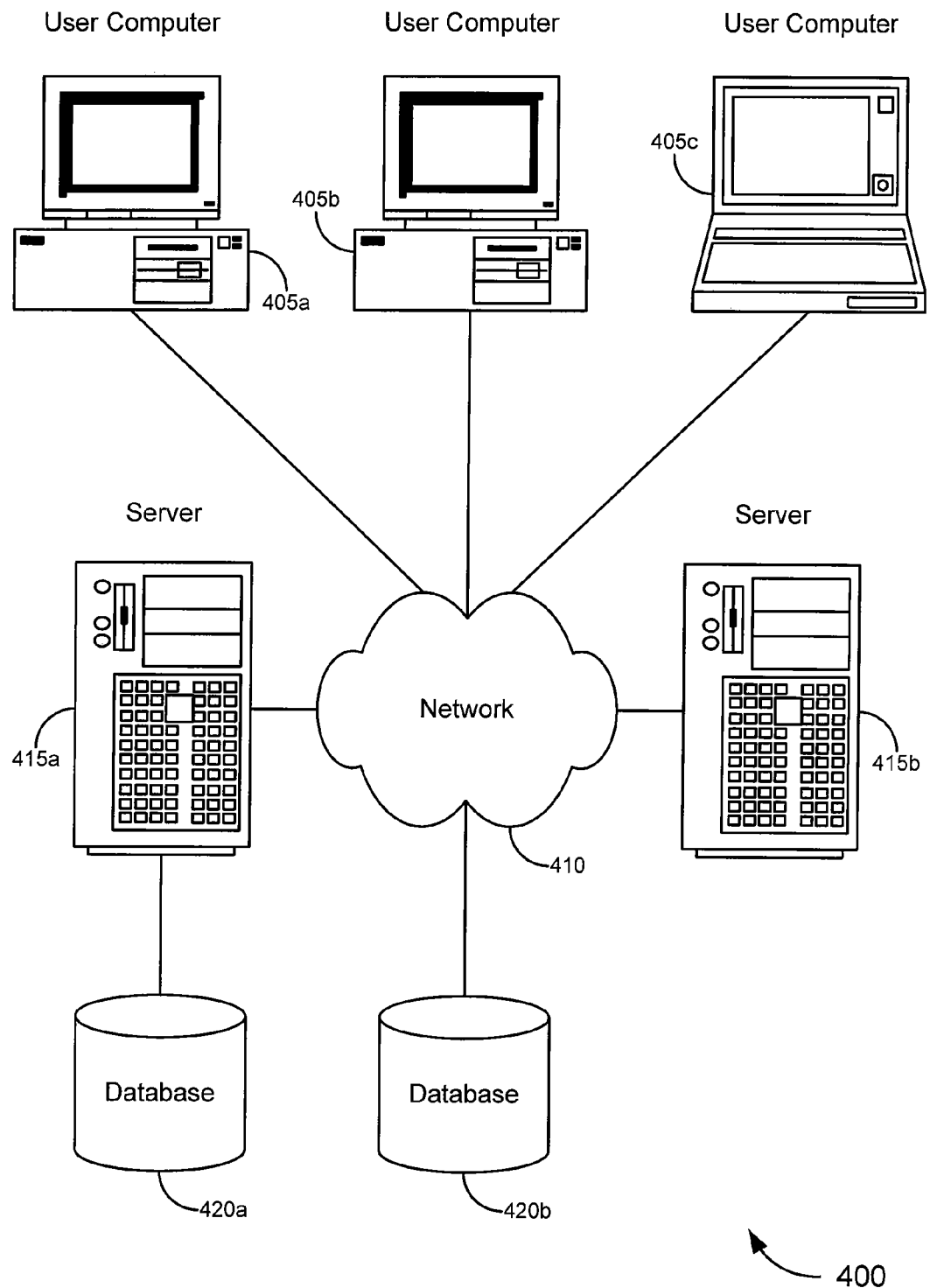
FIG. 4 is a block diagram illustrating a networked system of computers, which can be used in accordance with various embodiments of the invention.

A set of embodiments comprises systems for implementing a cache model in a prefetching system. In one embodiment, proxy server 220, web server 230, and/or client 205, (as shown in FIG. 2), may be implemented as computer system 300 in FIG. 3. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, as well as one or more office applications, database client and/or server applications, and web browser applications. Alternatively, the user computers 405 can be any other electronic device, such as a thin-client computer, Internet-enabled mobile telephone, and/or personal digital assistant (PDA), capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 405 to perform methods of the invention.

The server computers 415, in some embodiments, might include one or more application servers, which can include one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 405 and/or another server 415. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement methods of the invention incorporated by an application running on a user computer 405 and/or another server 415. Alternatively, as those skilled in the art will appreciate, a file server can include all necessary files, allowing such an application to be invoked remotely by a user computer 405 and/or server 415. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420a might reside on a storage medium local to (and/or resident in) a server 415a (and/or a user computer 405). Alternatively, a database 420b can be remote from any or all of the computers 405, 415, so long as the database can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of enhancing prefetch operations, the method comprising:
    storing, at a server-side proxy, a cache model for a client device's browser cache, wherein the cache model comprises a copy of caching instructions for objects previously downloaded to the client device and referenced by the cache model, wherein the caching instructions for each object referenced by the cache model indicates an expiration time of the respective object at the client device and includes an object-specific caching instruction;
    receiving a web page at the server-side proxy in response to a request for the web page from the client device;
    identifying, at the server-side proxy, a prefetchable reference to the object in the web page;
    determining, at the server-side proxy using the copy of the caching instructions, that the previously downloaded object does not satisfy the caching instructions;
    in response to the determination, sending a prefetch request for the object from the server-side proxy to a web server;
    receiving, at the server-side proxy, a prefetched response to the prefetch request from the web server, the prefetched response indicating that the object has not been changed since being previously downloaded; and
    transmitting the prefetched response to a client-side proxy to use the previously downloaded object in response to a subsequent request for the object from the client device.

2. The method of enhancing prefetch operations of claim 1, wherein the copy of the caching instructions for the object is stored to a persistent storage device.

3. The method of enhancing prefetch operations of claim 2, further comprising accessing the persistent storage device when responding to prefetch requests.

4. The method of enhancing prefetch operations of claim 1, wherein the caching instructions include a checksum value for the object.

5. The method of enhancing prefetch operations of claim 4, further comprising comparing the checksum value associated with the object with a current checksum received from the web server to determine if the object has changed since it was prefetched.

6. The method of enhancing prefetch operations of claim 5, further comprising, in response to the checksum values not matching, prefetching an updated copy of the object from the web server.

7. The method of enhancing prefetch operations of claim 6, wherein the checksum values are stored in an entity tag.

8. The method of enhancing prefetch operations of claim 1, further comprising maintaining a list of last modified date entries associated with each object previously downloaded to the browser cache.

9. The method of enhancing prefetch operations of claim 8, wherein determining that the prefetchable reference does not satisfy the caching instructions comprises using the list of last modified date entries.

10. The method of enhancing prefetch operations of claim 1, further comprising maintaining a list of caching instructions for each object previously downloaded to the browser cache.

11. The method of enhancing prefetch operations of claim 10, wherein the caching instructions comprise at least one of: a last modified date, an expiration date, caching permitted flag, and an entity tag.

12. The method of enhancing prefetch operations of claim 1, further comprising storing cache model entries for each object.

13. The method of enhancing prefetch operations of claim 12, further comprising updating the cache model entries with modified dates received from the prefetch response.

14. The method of claim 1 wherein the caching instructions comprise instructions for all objects downloaded by the server-side proxy on behalf of the client device.

15. The method of claim 14 wherein the cache model further comprises a list of uniform resource locators for all objects downloaded by the server-side proxy on behalf of the client device.

16. The method of claim 1, further comprising generating an inference based on a pattern of requests for web objects received from the client device; and updating the client caching model based on the inference.

17. A system for enhancing prefetch operations, the system comprising:
 a server-side proxy connected with a client device via a client-side proxy, wherein the client-side proxy is configured to transmit an object request and store an object previously downloaded to a browser cache of the client device, and wherein the server-side proxy comprises one or more processors in communication with one or more memories storing instructions, the one or more processors executing the instructions to:
  store a cache model for client device's browser cache, wherein the cache model comprises a copy of caching instructions for objects previously downloaded to the client device and referenced by the cache model, wherein the caching instructions for each object referenced by the cache model indicates an expiration time of the respective object at the client device and includes an object-specific caching instruction;
  receive a web page responsive to a request for the web page from the client device;
  identify a prefetchable reference to the object in the web page;
  determine, using the copy of the caching instructions, that the previously downloaded object does not satisfy the caching instructions;
  in response to the determination, send a prefetch request for the object to a web server;
  receive a prefetched response to the prefetch request from the web server, the prefetched response indicating that the object has not been changed since being previously downloaded; and
  transmit the prefetched response to the client-side proxy to use the previously downloaded object in response to a subsequent request for the object from the client device.

18. The system for enhancing prefetch operations of claim 17, wherein the server-side proxy comprises a storage device configured to store the caching instructions for the object.

19. A method of enhancing prefetch operations, the method comprising:
 storing, at a client-side proxy, an object;
 receiving, at the client-side proxy, a prefetched response to a server-side proxy request for the object, wherein the prefetched response indicates that the object is a current copy of the object from a content server, wherein the server side proxy comprises a cache model for a client device's browser cache, the cache model comprising a copy of caching instructions for objects previously downloaded to the client device and referenced by cache model, wherein the caching instructions for each object referenced by the cache model indicates an expiration time of the respective object at the client device and includes an object-specific caching instruction, and wherein the server-side proxy request for the object is created in response to a determination by the server-side proxy using the copy of the caching instructions that the object does not satisfy the caching instructions for using the object;
 receiving, at the client-side proxy, a request for the object from the client device; and
 responding to the request for the object from the client device, by the client-side proxy, using the prefetched response.

20. The method of claim 19 wherein the server-side proxy request for the object comprises an If-Modified-Since directive communicated to the content server.

21. The method of claim 19 wherein the server-side proxy request for the object comprises an entity tag associated with the object.

22. A system for enhancing prefetch operations, the system comprising:
 a client-side proxy at a client device, the client-side proxy connected to a server-side proxy, wherein the client-side proxy comprises one or more processors in communication with one or more memories storing instructions, the one or more processors executing the instructions to:
  store an object;
  receive a prefetched response to a server-side proxy request for the object, wherein the prefetched response indicates that the object is a current copy of the object from a content server, wherein the server side proxy comprises a cache model for a client device's browser cache, the cache model comprising a copy of caching instructions for object previously downloaded to the client device and referenced by cache model, wherein the caching instructions for each object referenced by the cache model indicates an expiration time of the respective object at the client device and includes an object-specific caching instruction, and wherein the server-side proxy request for the object is created in response to a determination by the server-side proxy using the copy of the caching instructions that the object does not satisfy the caching instructions for using the object;

receive a request for the object from the client device; and respond to the request for the object from the client device using the prefetched response.

23. The system of claim 22 wherein the server-side proxy request for the object comprises an If-Modified-Since directive communicated to the content server.

24. The system of claim 22 wherein the server-side proxy request for the object comprises an entity tag associated with the object.

* * * * *